(No Model.)
W. F. ELLIOTT & S. D. LANCE.
FOOT IRONS FOR VEHICLE DASH FRAMES.
No. 275,811. Patented Apr. 17, 1883.
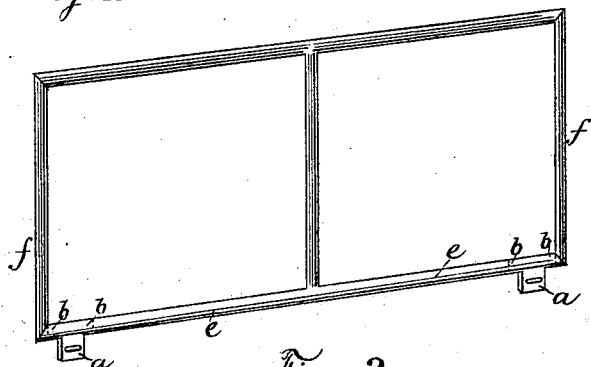
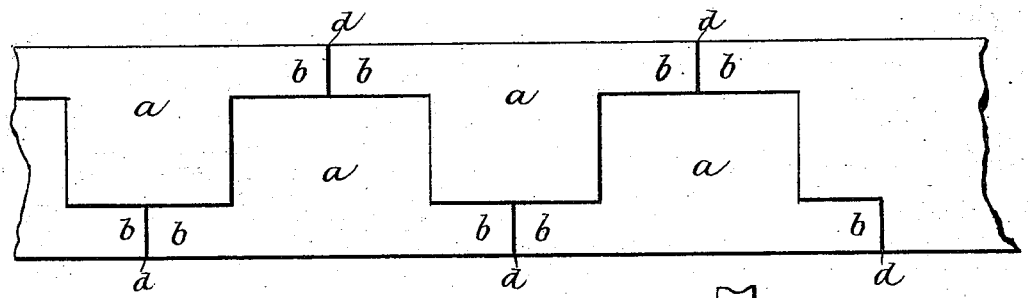
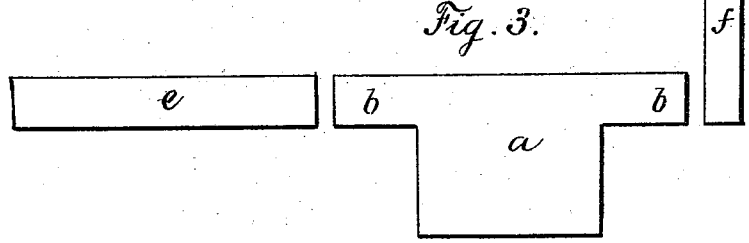
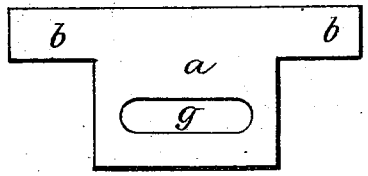
Witnesses:
Edmond Brodhag
Woodbury Lowery
Inventors:
William F. Elliott
Shields D. Lance
Johnson & Johnson
Atty

UNITED STATES PATENT OFFICE.

WILLIAM F. ELLIOTT AND SHIELDS D. LANCE, OF COLUMBUS, OHIO.

FOOT-IRON FOR VEHICLE DASH-FRAMES.

SPECIFICATION forming part of Letters Patent No. 275,811, dated April 17, 1883.

Application filed October 19, 1882. (No model.)

*To all whom it may concern:*

Be it known that we, WILLIAM F. ELLIOTT and SHIELDS D. LANCE, citizens of the United States, residing at Columbus, in the county of Franklin and State of Ohio, have invented new and useful Improvements in Foot-Irons for Vehicle Dash-Frames, of which the following is a specification.

Our improvement relates to vehicle dash-feet which are attached to the outside of the vehicle-body; and the object of our improvement is to reduce the cost of labor and material in the production of the irons, and to render them easily and quickly welded to the frame. They are furnished the trade as dash-feet or block-irons, and are cut from a bar of the desired width and thickness without waste. Ordinarily such dash-frames are forged from iron rods and the feet welded to its lower bar; but by our improvement the foot-iron is produced as a section of the lower bar of the frame in the form of the letter T, the arms of which are welded to the vertical and horizontal bars of the frame. Foot-irons have also been cut from a bar as blanks, in which one lower angle of the frame is ready-shaped, with a portion of the vertical end bar on one side of the foot, and a parallel side on the other side of the foot, which requires a subsequent forming to bring it in position to form a section of the lower horizontal bar of the frame; but in cutting such blank there is much waste in the bar, and the cut is so made as to only partially produce the complete blank. By our improvement the blank is produced complete at the cutting.

In the drawings, a vehicle dash-frame is shown in Figure 1 with the feet $a$ $a$, by which it is attached to the body of the vehicle. In Fig. 2 is illustrated the method of producing the foot-blanks complete from a bar without waste; and in Fig. 3 is shown the T-shaped iron or blank in the relation it occupies to the vertical and horizontal bars of the frame to which it is welded, and Fig. 4 the slotted foot-blank. The bar from which the foot-blanks are produced is of a width that will cut two blanks with the arms $b$ $b$ of the T along the edges of the bar and foot parts $a$ proper matching alternately with each other, and with the arms crosswise of the bar, so as to bring the joining ends $d$ of the arms of two blanks in the middle of the width of the foot part, whereby complete blanks are cut from the body of the bar from its opposite edges. The blank thus produced forms a section of the lower bar, $e$, of the frame, its arms corresponding to said bar and forming a part of it when welded to the frame. These foot-blanks are furnished the trade, and in making the dash-frame its lower bar is welded to the end of one arm, and its vertical end bar, $f$, is welded to the end of the other arm, forming one of the lower angles of the frame. The foot part is about an inch and a half square, and the arms about three quarters of an inch long and three-eighths of an inch wide. The foot-blank may be finished with a slot, $g$, and then stamped in any desired shape to suit the trade. It is secured to the vehicle-body by passing the bolt through the slot in the foot.

We claim—

The sheet-metal T-shaped foot-blank herein described and shown, as a new article of manufacture, for vehicle dash-frames.

In testimony whereof we have hereunto set our hands in the presence of two subscribing witnesses.

WILLIAM F. ELLIOTT.
SHIELDS D. LANCE.

Witnesses:
F. C. AYER,
GEO. L. ARTZ.